Patented Feb. 8, 1949

2,460,878

UNITED STATES PATENT OFFICE 2,460,878

COATING COMPOSITION

Charles Di Battista and Bernard Lewis Di Battista, Cranford, N. J.

No Drawing. Application July 9, 1946, Serial No. 682,307

2 Claims. (Cl. 106—84)

The present invention relates to a coating composition especially adapted for use in the waterproofing, painting, or otherwise decorating of masonry surfaces. It is particularly useful in the treatment of surfaces of the so-called asbestos shingles of commerce, however it may also be used with advantage on concrete, stucco, and other materials containing free lime, and on brick, stone and the like.

Primary ingredients of the asbestos shingles of commerce are Portland cement, water and asbestos fibers. Though such shingles have been widely used for some years, no entirely satisfactory paint has heretofore been developed for their decoration and preservation. The difficulty in providing a suitable paint for this purpose has been due in part, at least, to the alkalinity of the material, caused by the presence of free lime.

It has previously been proposed to use for this purpose a coating material having a sodium silicate base. However, such coating materials have not been found satisfactory for the purpose, for the reason that the sodium silicate in the course of time "blooms out" forming a white salt or saltlike material on the painted surface. Our present coating composition is free from this objectionable characteristic.

In the compounding of our present coating material, we use as the vehicle an aqueous solution of potassium silicate, advantageously of 15 to 25° Bé., and admixed with the vehicle a minor proportion of glycerine and silica, barium sulfate and titanium oxide, advantageous in an aggregate amount about equal to the weight of the vehicle.

Considerable latitude is permissible with respect to the amounts of the glycerine and the several pigments used. We have with particular advantage used 200 mesh silica, marketed as "Silex White," barium sulfate (BaSO$_4$), titanium oxide (TiO$_2$) and glycerine in the following proportions:

| | Per cent |
|---|---|
| Silica | 60 |
| Barium sulfate | 27.5 |
| Titanium oxide | 10 |
| Glycerine | 2.5 | admixing these materials, herein for convenience designated composite pigment mixture, with the potassium silicate vehicle in proportions of about 8 pounds of the composite pigment mixture per gallon of the vehicle.

These particular proportions of the pigments have been found especially advantageous for the reason that the specific gravity of the pigment mixture is approximately that of the vehicle, which has been found materially to lessen the tendency of the pigments to settle out, a tendency common to most paints and the like.

However, the relative proportions of the several pigments and of the glycerine used to make up the so-called composite pigment mixture may be varied within the following ranges:

| | |
|---|---|
| Silica | From about 40 to about 70% |
| Barium sulfate | From about 25 to about 40% |
| Titanium oxide | From about 5 to about 20% |
| Glycerine | From about 1 to about 4% |

For ordinary use, it is generally desirable to use about 8 pounds of the composite pigment mixture per gallon of vehicle. However, this proportion may with advantage be increased to as great as about 11 pounds per gallon, particularly where the proportion of the silica constituent of the composite pigment mixture approaches the upper end of the prescribed range.

The compounding of our improved coating composition may be carried out by conventional mixing methods adapted thoroughly to disperse the pigments and glycerine in the carrier, and no special mixing apparatus or procedure is necessary. The several pigments may be premixed or separately added to the vehicle.

Our improved coating material is not only decorative, but also waterproofs the surface to which it is applied, by closing all pores and hair line or shrinkage cracks in the surface of the material. Further, it forms a strong bond with masonry surfaces, and, where free lime is present, the potassium silicate eventually combines with the lime to form calcium silicate, thus binding the coating chemically as well as physically to the surface.

The composition specifically described will of course produce a white coating material. However, it may be made in a great variety of colors by the adding of an alkali-stable dye, or a mixture of such dyes, to the composition described.

Our improved coating material is fireproof, acid proof, and to a substantial extent resistant to alkalies. It is insoluble in oil and ordinary hydrocarbon solvents and is not affected by fumes ordinarily encountered. The coating has extraordinary resistance to discoloration, and where alkali-resistant dyestuffs are incorporated therein, are extraordinarily resistant to color change or fading. Many dyestuffs stable in alkaline environment are available on the market and need not here be enumerated.

We claim:

1. A decorative coating composition for masonry surfaces comprising an aqueous solution of potassium silicate of 15 to 25° Bé., as a vehicle and containing about 8 to about 11 pounds, per gallon of the vehicle, of a composite pigment mixture composed of the following materials in proportions by weight within the indicated ranges:

| | Per cent |
|---|---|
| Silica | 40 to 70 |
| Barium sulfate | 25 to 40 |
| Titanium oxide | 5 to 20 |
| Glycerine | 1 to 4 |

2. A decorative coating composition comprising an aqueous solution of potassium silicate of 15 to 25° Bé., as a vehicle, and containing about 8 pounds, per gallon of the vehicle, of a composite pigment mixture composed of the following constituents in proportions by weight approximately as indicated:

| | Per cent |
|---|---|
| Silica | 60 |
| Barium sulfate | 27.5 |
| Titanium oxide | 10 |
| Glycerine | 2.5 |

CHARLES DI BATTISTA.
BERNARD LEWIS DI BATTISTA.

REFERENCES CITED

The following references are of record in the file of this patent:

UNITED STATES PATENTS

| Number | Name | Date |
|---|---|---|
| 1,799,949 | Boughton | Apr. 7, 1931 |
| 2,046,494 | Van Rolleghem | July 7, 1936 |
| 2,372,285 | Marc | Mar. 27, 1945 |

FOREIGN PATENTS

| Number | Country | Date |
|---|---|---|
| 1,853 | Great Britain | 1880 |